(12) United States Patent
Weedon

(10) Patent No.: US 7,279,019 B2
(45) Date of Patent: Oct. 9, 2007

(54) ENDOTHERMIC REACTION PROCESS AND AN APPARATUS THEREFOR

(76) Inventor: Geoffrey G. Weedon, 19 South Road, Twickenham, Middlesex (GB) TW2 5NU ( * ) Notice: Subject to any disclaimer, the term of this patent is extended or adjusted under 35 U.S.C. 154(b) by 647 days.

(21) Appl. No.: 10/220,500

(22) PCT Filed: Feb. 28, 2001

(86) PCT No.: PCT/GB01/00870

§ 371 (c)(1),
(2), (4) Date: Nov. 18, 2002

(87) PCT Pub. No.: WO01/64327

PCT Pub. Date: Sep. 7, 2001

(65) Prior Publication Data

US 2003/0101651 A1    Jun. 5, 2003

(30) Foreign Application Priority Data

Mar. 1, 2000  (GB) ................................ 0004934.6

(51) Int. Cl.
*C10J 3/54*    (2006.01)
(52) U.S. Cl. ............................ 48/197 R; 48/61; 48/97; 48/198.1; 48/198.7; 48/214 R; 422/197; 422/202; 422/204
(58) Field of Classification Search .................... 48/61, 48/97, 197 R, 198.1, 198.7, 214 R
See application file for complete search history.

(56) References Cited

U.S. PATENT DOCUMENTS

| | | |
|---|---|---|
| 5,565,009 A | 10/1996 | Ruhl et al. |
| 2001/0022953 A1* | 9/2001 | Hermann et al. ........... 422/211 |

FOREIGN PATENT DOCUMENTS

| | | |
|---|---|---|
| DE | 93 20 711 U | 1/1995 |
| EP | 0 895 806 A | 2/1999 |
| GB | 954 844 A | 4/1964 |
| NL | 8 802 129 A | 3/1989 |

OTHER PUBLICATIONS

Patent Abstracts of Japan, vol. 017, No. 533, Sep. 27, 1993 & JP 05 147901 A, Jun. 15, 1993.

* cited by examiner

*Primary Examiner*—Glenn Caldarola
*Assistant Examiner*—Vinit H. Patel
(74) *Attorney, Agent, or Firm*—Nixon & Vanderhye P.C.

(57) ABSTRACT

A process for an endothermic reaction includes the steps of carrying out an exothermic reaction in which a fuel is combusted to generate heat for transfer to a feedstock subject to an endothermic reaction, the waste heat from the exothermic and endothermic reactions being transferred to at least three fluid streams within a single heat recovery zone downstream of the endothermic and exothermic reactions, the apparatus therefor being contained within a single vessel.

17 Claims, 9 Drawing Sheets

ENDOTHERMIC REACTION PROCESS AND AN APPARATUS THEREFOR

This application is the US national phase of international application PCT/GB01/00870 filed 28 Feb. 2001 which designated the U.S.

The invention concerns improvements in or relating to a reaction process and an apparatus therefor.

In particular the present invention has reference to such a process and apparatus in which endothermic and exothermic reactions occur simultaneously whereby the heat required for the former is supplied by the latter.

It is well known to produce synthesis gas, for example, using steam reforming of natural gas or other carbonaceous materials utilising generally large scale reformers, which are in essence large "boxes", containing single or multiple rows of reformer tubes, through which the endothermic reactants flow, which may or may not contain catalyst to promote the endothermic reaction.

Combustion occurs at roughly atmospheric pressure within the boxes, heat transfer to the tubes occurring principally via radiation from the combustion gases or walls of the reformer.

Waste heat from the reformed gas and combustion gases is generally recovered outside and adjacent to the boxes, via separate heat recovery devices.

The principal disadvantages of this conventional technology relate to the large weight and spatial volume of the reformers, resulting in high construction and component costs, and making their use in many locations, particularly remote areas and offshore, for example, prohibitive.

Associated with the large mass of conventional reformers and their associated equipment is considerable thermal inertia, resulting in long periods for heat-up and cool-down of the reformers, and high associated energy consumption costs.

There have been several attempts in recent years to design a device to replace these large conventional reformers with more compact devices but with limited success.

Generally, these more compact devices have suffered from practical limitations in mechanical design or poor thermal efficiencies, or are not suitable for large-scale industrial applications One such attempt is described in U.S. Pat. No. 5,567,398 to Ruhl et al which essentially teaches the employment of counter-flow streams for the endothermic feedstock and the exothermic combustion gases. One disadvantage of this prior art proposal resides in the high metal wall temperatures for a given endothermic reaction end temperature which is due to the location of the peak heat flux close to the burner tips being near to the location of the peak endothermic reaction temperature. Any distortion of the burner flame or maldistribution of fuel or air can result in tube wall temperatures exceeding their design resulting in premature tube failure.

The Ruhl et al arrangement limits the preheating of the endothermic reaction feed stream with combustion gases only, with the effect that maximum use of waste heat contained in the combustion product gases cannot be achieved in a single vessel. The result is that the overall potential efficiency of the process cannot be realised with the prior art apparatus.

Furthermore, the Ruhl et al arrangement also limits the preheating of the exothermic reaction feed streams with endothermic reaction products only, thus limiting the degree of cooling that can be achieved for the endothermic reaction products in the apparatus without excessive heating of the exothermic reaction feeds. Quite apart from the negative effect on the overall potential efficiency of the vessel employed, there is also a negative impact on the selection of downstream component parts which must be able to resist 'metal dusting' corrosion.

U.S. Pat. No. 5,565,009 discloses an endothermic reaction furnace which also displays similar drawbacks to those outlined above in relation to the Ruhl et al teaching, particularly in relation to the effect of the counter-current flow regime.

The 'efficiency' of the process can be measured in a number of ways, but of particular interest are the 'net fuel efficiency' and the ratio of total heat transferred to heat released. The former is a measure in percentage terms of the total fuel energy (based on fuel LCV) that is utilised within the process or apparatus, which increases as the combustion gas discharge temperature to atmosphere decreases. It is also affected by the quality of the fuel; the lower the fuel LCV, the lower will be the net fuel efficiency for a given combustion products exit temperature.

The aforementioned ratio is a measure of the amount of heat that is transferred within the process or apparatus compared to that which is released by combustion of the fuel, which increases as the total preheat to fuel, combustion air and process feedstock is increased. It is limited by whatever are deemed to be the maximum desirable or practical preheat temperatures of the three aforementioned streams. This ratio can exceed 100%, and is maximised by heating of additional streams within the process or apparatus.

An object of the present invention is therefore to provide an improved process and apparatus which will obviate the disadvantages of the prior art.

A further object of the present invention is to provide a more compact and more cost-effective arrangement yielding a potentially greater overall net fuel efficiency and ratio of total heat transferred to heat released than can be realised with existing processes and equipment.

According to a first aspect of the invention a process for carrying out an endothermic reaction includes the steps of initiating in an exothermic reaction region an exothermic reaction by combusting a preheated fuel in the presence of a preheated combustion-sustaining medium thereby to generate heat to produce a combustion gas stream, causing a feedstock stream to undergo an endothermic reaction in an endothermic reaction region adjacent to the exothermic reaction region, transferring heat substantially convectively from the combustion gas stream to the feedstock stream thereby to produce a process gas stream, the combustion gas stream and the feedstock streams being in co-current flow relationship, passing the combustion gas stream and the process gas stream co-currently into a heat recovery zone downstream of the exothermic reaction zone wherein heat from the process gas stream is convectively transferred to the combustion gas stream, and simultaneously heat is recovered by passing the combustion gas stream in convective heat exchange relation with the combustion-sustaining medium and with the process feedstock and with the fuel, thereby to control the temperature of the process gas and combustion gas streams, the process gas stream being fed directly and continuously through the heat recovery zone, and the combustion gas stream and the process gas stream being discharged from the process at a temperature level whereby the overall efficiency of the process is optimised.

Advantageously heat is further recovered from the process gas stream and the combustion gas stream, heat transfer being effected to at least one other flow circuit for a fluid stream, for example feedstock saturator circulating water.

In the process of the invention by the use of the preheat mechanism herein defined a high process efficiency can be obtained by virtue of the versatility of transferring heat to the various process streams. In this way, the temperature of the endothermic reaction product, i.e. the process gas stream, can be maintained at a level of approximately 400° C. and the temperature of the exothermic combustion gas stream can be maintained at a level of less than 250° C. in one process zone. Further reductions in these temperatures are possible, depending on the temperatures of the cold streams to be heated and the economics of further heat exchange.

Advantageously, one of the streams to be heated in the heat recovery zone will contain water for the provision of steam to the process feedstock, a particularly useful method well-known to those skilled in the art being the preheat of circulating water to a feedstock saturator. Other methods may be the formation of steam directly from water, i.e. a boiler.

Conveniently the flow within the heat recovery zone of the recipient streams is generally transverse to the direction of flow of the exothermic and endothermic reaction streams. Alternatively, the flow within the heat recovery zone may be generally co- or counter-directional in relation to the direction of flow of the exothermic and endothermic reaction streams.

Further, it is of advantage by way of optimisation to cause the recipient streams flow within the heat recovery zone to be tortuous in order to extend the flow path thereby to enhance heat transfer through increased surface area of the containing tubes and heat transfer coefficient.

Conveniently, the exothermic and endothermic streams are co-current in a downward direction, although other orientations may be employed.

For the optimisation of heat transfer between the process gas stream and the combustion gas stream in the heat recovery zones, the velocity of the streams is enhanced thereby to increase the heat transfer coefficient.

The process of the invention allows the preheating of the feedstock and indeed of the fuel gas stream in such manner that the exit temperatures of each can be controlled by suitable by-passing round the preheat, i.e. heat recovery zone, thus permitting control of the heat input to the endothermic reaction without needing to adjust the oxygen content, i.e. excess air, of the combustion products as is necessary in the prior art, e.g. U.S. Pat. No. 5,565,009. Accordingly, the process of the invention can be operated at or near optimum efficiency despite variations in heat transfer performance, e.g. from fouling.

The process also permits the provision of staged combustion by the use of extended or additional fuel tubes within the combustion zone, whereby the fuel gas is released in stages so as to reduce the peak combustion temperature, thereby reducing the peak flux through the endothermic reaction tubes and the concentration of nitrogen oxides in the combustion products.

Furthermore the fuel gas burner tubes may be constructed of porous material whereby fuel is released continuously from the tubes along their length. Combustion catalyst may be applied to the outside of the burner tubes so as to permit operation at a still lower peak combustion temperature.

The process allows the preheat of combustion air, followed by combustion, then by heat exchange of combustion products back to combustion air, which permits rapid and trouble-free start-up and shut-down, and ensures that there is no rapid quenching of endothermic reaction tubes by cold air, which can lead to overstressing and premature tube failures in conventional and prior art processes.

Provision may also be made for the temporary initial application of heat from an auxiliary source upon start-up of the process, and such heat source may be constituted by suitable burners provided for that purpose in association with the combustion-sustaining medium.

The provision of facilities for initial preheat of air to above about 550° C., or the fuel auto-ignition temperature, allows fuel gas to ignite spontaneously on injection into the combustion zone, thereby obviating the need for an ignition device.

The heat exchange circuit previously described results in provision of minimal necessary heat for start-up of the process, since most of the heat input is recovered and recycled within the process, resulting in significantly lower start-up energy costs than is the case with conventional and prior art processes.

Such start-up facilities may be further minimised by the provision of combustion initiating catalyst provided at convenient locations within the combustion zone, such catalyst reducing the necessary air preheat temperature.

Further energy efficiency may be obtained by routing of the cold combustion-sustaining medium in such a manner as to minimise heat loss from the process to atmosphere.

The invention also includes the step of passing the process gas within or downstream of the heat recovery zone into another process phase. For example the process gas may be fed through a further processing section contained within the endothermic reaction tubes in the heat transfer zone, such section containing a high temperature shift catalyst to increase the hydrogen content of the gas, such arrangement improving still further the overall process efficiency by recovering within the process the exothermic reaction heat from the water-gas shift reaction.

Moreover, the combustion gas stream may in yet a further step is fed downstream of the heat recovery zone to a treatment zone wherein the gas is cleaned to remove NOx and any other contaminants. Conventional techniques may be employed for such a cleaning step. For example catalytic treatment may be used for $NO_x$ reduction and removal of trace partial combustion products.

In the alternative, the combustion gas stream may be discharged directly to atmosphere.

According to a second aspect of the present invention there is provided an apparatus for carrying out the process of the first aspect, wherein the apparatus includes a containment shell housing an exothermic reaction region and an endothermic reaction region, the exothermic reaction region having a fuel inlet associated with one end of the shell and in flow communication with a plurality of burner tubes, a plenum associated with and in flow communication with the burners tubes and adapted in use to provide a preheated combustion-sustaining medium for the combustion of the fuel to provide a combustion gas stream, the burner tubes passing through the plenum, a fire box to convey the combustion gas stream, an endothermic reaction region including a feedstock inlet leading to a plurality of reaction tubes situated within the fire box for receiving heat substantially convectively in use from the combustion gas stream to produce a process gas, a heat recovery zone downstream of the exothermic reaction region through which zone the endothermic reaction tubes pass directly, the heat recovery zone being adapted in use to preheat the combustion-sustaining medium and further fluid streams using heat from both the combustion gas stream and the endothermic process gas stream, the heat recovery zone including a plurality of heat exchange modules in which tubes containing fluids to be preheated are in flow association in use with the combustion gas stream only, a combustion gas stream outlet, and a process gas outlet.

The modules of the heat recovery zone may conveniently be arranged in series, parallel, or intermixed, or any combination to maximise heat recovery and process efficiency and minimise cost. The modules may be suitably spaced in order to give effect to the desired profiles of the process gas and combustion gas temperatures.

The endothermic reaction tubes are advantageously held at their inlet ends by means of a tube sheet arranged across and secured within the shell and preferably their distal ends are not restrained thereby to avoid the generation of undesirable stress levels and consequential tube distortion.

It is well known to those skilled in the art that between the temperatures of about 800° C. down to less than 450° C. most commonly used metal surfaces in contact with synthesis gas containing even moderate amounts of carbon oxides are subject to attack, and corrosion by the mechanism known as carborisation, resulting in metal dusting of the metal. In order to avoid this corrosion, which may otherwise occur within the apparatus heat recovery zone, suitable coatings may be applied to the endothermic reaction tubes, such as an aluminium diffusion coating, such coatings being well-known in the art.

The burner tubes are held within a tube sheet arranged across and releasably secured within the shell which enables the ready maintenance thereof. The removal of the burner tubesheet also allows access for inspection and maintenance purposes of the endothermic reaction tubes which may be withdrawn through the fuel inlet end of the shell, and for catalyst loading and unloading.

In order to maximise the benefits of the process it is advantageous to operate at as high a pressure feedstock as possible. Generally the maximum practical pressure is determined by mechanical and fabrication considerations which often result in a limitation being fixed by the maximum practical tubesheet thickness. To minimise the thickness of the tubesheets forming the feedstock plenum the tubesheets are advantageously fixed to the tubes which form the outer wall of the conduit for the combustion-sustaining medium through the feedstock plenum, thereby forming an interconnected double-tubesheet arrangement. This results in substantially thinner tubesheet thicknesses than would be the case with the use of single tubesheet design which, apart from the reduced cost and weight benefits, also results in much lower differential wall stresses and potential distortion during start-ups and shutdowns. The use of the interconnected double tubesheet arrangement allows for the practical operation of the process at pressures in excess of 60 atmospheres in an apparatus with relatively large diameter tubesheets, such as exceeding 2000 mm, enabling, for example, produced synthesis gas to be fed directly to a methanol synthesis process without the need for synthesis gas compression.

Suitable ports are provided in the shell for the passage through the heat recovery zone and external piping may be provided from the zone to the respective regions for the fluid flow of the preheated streams, i.e. the combustion-sustaining medium and the process feedstock and the fuel.

In an alternative, the heat recovery zone may communicate with an internal conduit, for example an annular jacket, leading to the burners in the exothermic reaction zone, thereby obviating the need to provide external piping and resulting in greater thermal efficiency by minimising heat loss. A further advantage of this arrangement is that a metal internal wall is provided from which to support the firebox refractory insulation, the metal wall being at the temperature, in use, of the combustion sustaining medium, as are the tubesheets above and the walls and tubes thereto connected. As can be readily appreciated, this results in a device that is free from the differential stresses pertaining in prior art devices where tubesheets are present in use at different temperatures.

A still further advantage of this arrangement is that in use the internal dimensions of the firebox will be uniform and will accommodate the movement of the bottom feedstock tubesheet and the endothermic reaction tubes thereto connected, the lateral expansions being substantially the same in magnitude at all times.

In yet another alternative, the preheated process feedstock and or the preheated fuel may communicate with internal conduits leading to their respective distribution plenum, thereby obviating the need to provide external piping.

The mechanical arrangement of the preferred embodiment hereinafter described in detail is such that the three tubesheets above and below the feedstock and combustion sustaining medium plena and the walls and tubes thereto connected are all maintained at substantially the same temperature, i.e. at the combustion sustaining medium preheat temperature, by provision of appropriate surface insulation where necessary, thereby ensuring not only minimal undesirable stresses in the feedstock plenum tubesheets, but also ensuring that at all times the fuel burner tubes are in alignment with the tubes through which the combustion sustaining medium flows.

The heat transfer from combustion gases to the endothermic reaction tubes may be increased at the downstream end of the combustion zone by the provision of regularly spaced inert shapes which serve to increase the local velocity and turbulence of the combustion gases. These shapes may carry fins on their outer surfaces. Alternatively inert shapes such as balls may fill the spaces in a random manner between the endothermic reaction tubes.

The heat recovery zone may advantageously be constituted by banks of heat exchange tubes which may be orientated and disposed in such relation one to the other that a tortuous path is defined for the combustion gas stream within the firebox, thereby in use to enhance heat transfer by affording a greater turbulence than would otherwise be the case. The banks of tubes may be orientated horizontally and adjacent banks may be disposed orthogonally one to the other to provide in effect a matrix through which the combustion gas stream has to pass. The tubes may be profiled in order to modify the heat transfer characteristics. For example, the tubes may be finned, twisted, shaped, of varying diameter or contain inserts.

In like manner the endothermic reaction tubes may be similarly profiled.

The diameters of the heat recovery tubes and the endothermic reaction tubes may be varied to permit adjustment by design of the exit temperatures of the combustion gases and the process gas.

Inert shapes may be placed between the heat recovery tubes and around the endothermic tubes in a regular or random manner to further promote turbulence and heat transfer.

Depending on the size, thickness and length of the heat recovery tubes, provision of stays to prevent tube vibration may be provided. These stays would be preferentially connected tube to tube, said tubes being connected to those in like orientation. Advantageously these stays may be designed so as to promote additional turbulence and mixing of the combustion products stream.

The endothermic reaction tubes and the burner tubes are regularly arrayed.

Such array in combination with preheating of the fuel and the combustion-sustaining medium provides for substantially equal and geometrically similar heat input to each tube in the reaction zone and whereby the exothermic combustion gas streams are introduced to the endothermic reaction zone in such manner that results in substantially the same axial and circumferential tube wall temperature profiles.

The important provision of even temperature fuel and combustion-sustaining medium to each burner may be achieved by the separate bulk mixing of each prior to distribution to each burner. To this end also external provision of insulation to the fuel gas burner tubes may be applied, thereby ensuring that differential heating of fuel gas by flow of adjacent preheated combustion sustaining medium is minimised.

Provision of equal flow to each burner may be ensured by the location of a restriction orifice at the inlet of each burner tube, each providing sufficient pressure drop to ensure substantially equal flow to each burner under all circumstances. Likewise, provision of additional pressure drop to the combustion sustaining medium stream to each burner may be provided at the annulus surrounding each burner tube to ensure substantially equal flow to each.

Downstream of the final heat recovery zone there may be provided a gas clean-up phase for the combustion gas stream and such phase may include provision for the removal of $NO_x$ and other contaminants, and substantially all the excess oxygen if so desired. The gas clean-up phase may be incorporated within the shell and may incorporate further heat recovery devices.

Furthermore, a further phase may be included for the process gas stream, such for example as a high or low temperature shift reactor for the enhancement of the hydrogen content. Again, this phase could be included within the shell, more preferably within the endothermic reaction tubes at an appropriate location within the heat recovery zone.

At least one start-up burner may be provided downstream of the heat recovery zone in which combustion-sustaining medium, i.e. air, is preheated by combustion products from the fuel burners. In this instance, the temperature at any point in the apparatus does not exceed the relevant local normal operating temperature. Alternative means of preheating the air at this point may be utilised, such as an infra-red radiation heater.

Heat loss from the apparatus to atmosphere may be minimised by provision of suitable conduits for carrying cold combustion sustaining medium outside the firebox and or the heat recovery modules, either inside or immediately outside the apparatus outer shell.

By way of example only, a process for carrying out an endothermic reaction according to the invention and apparatus therefore are described below with reference to the accompanying drawings in which.

Figure 1A:
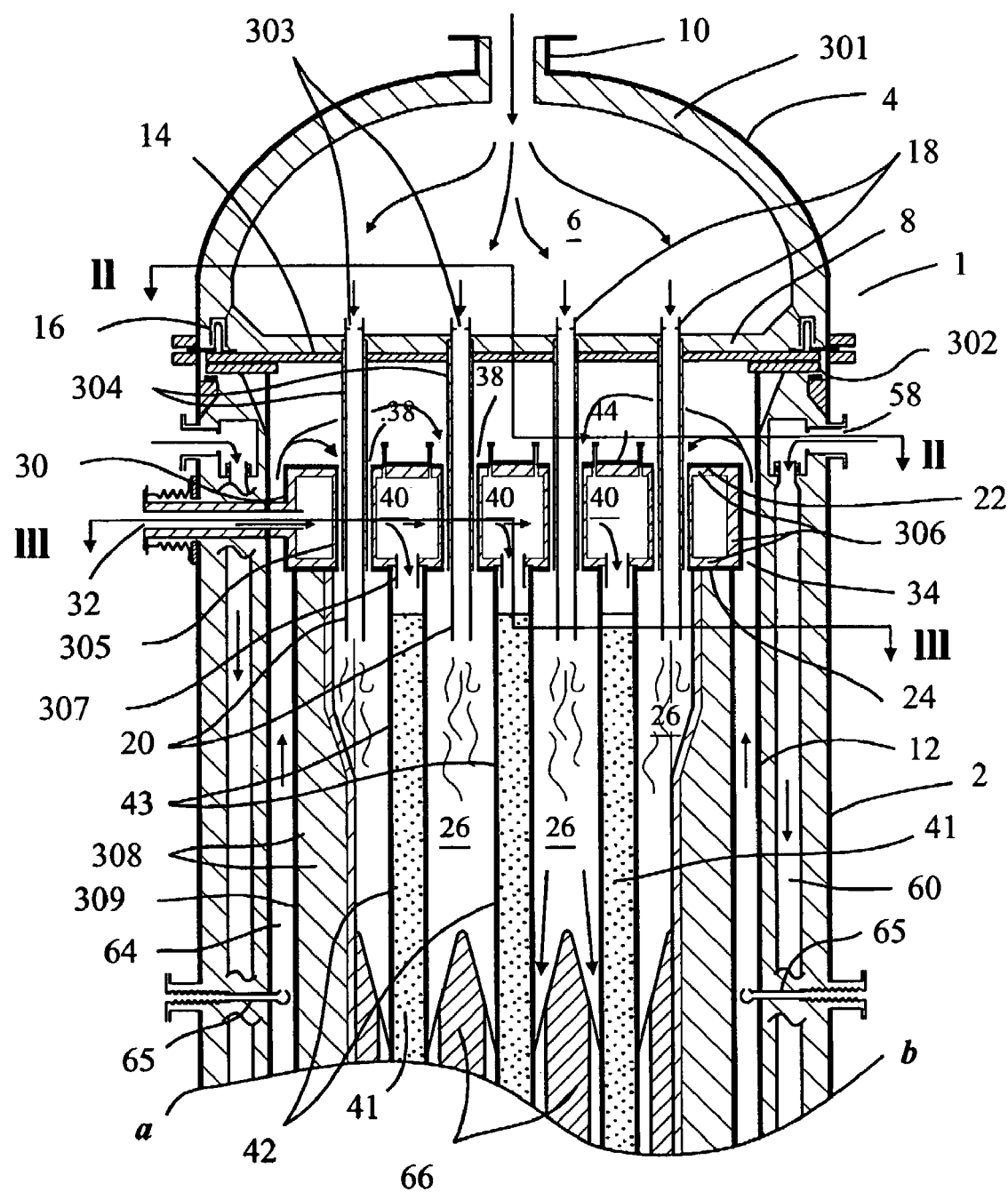
FIG. 1A is a vertical cross section through a top part of the apparatus.
Figure 1B:
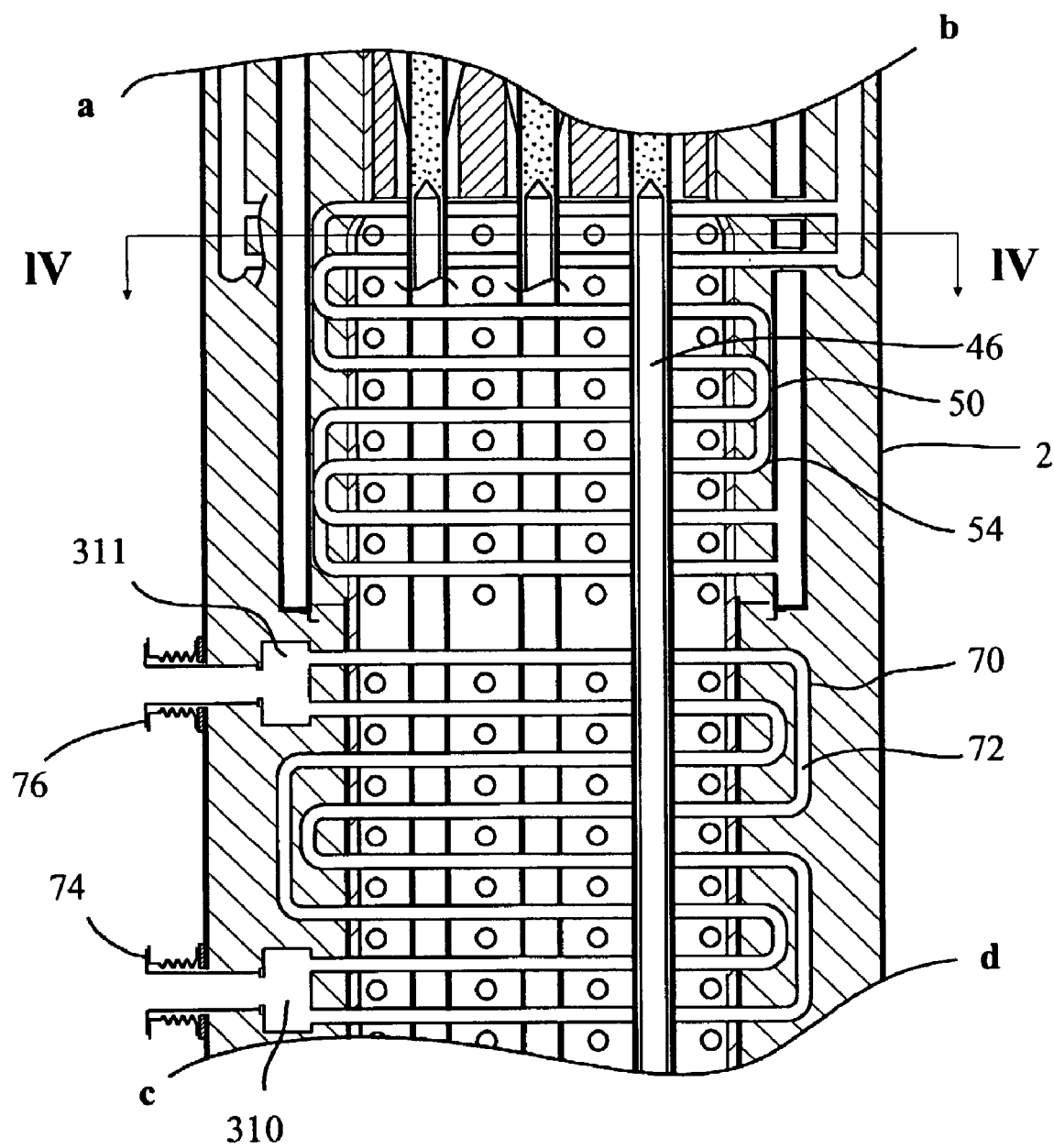
FIG. 1B is a vertical cross section through a middle part of the apparatus.
Figure 1C:
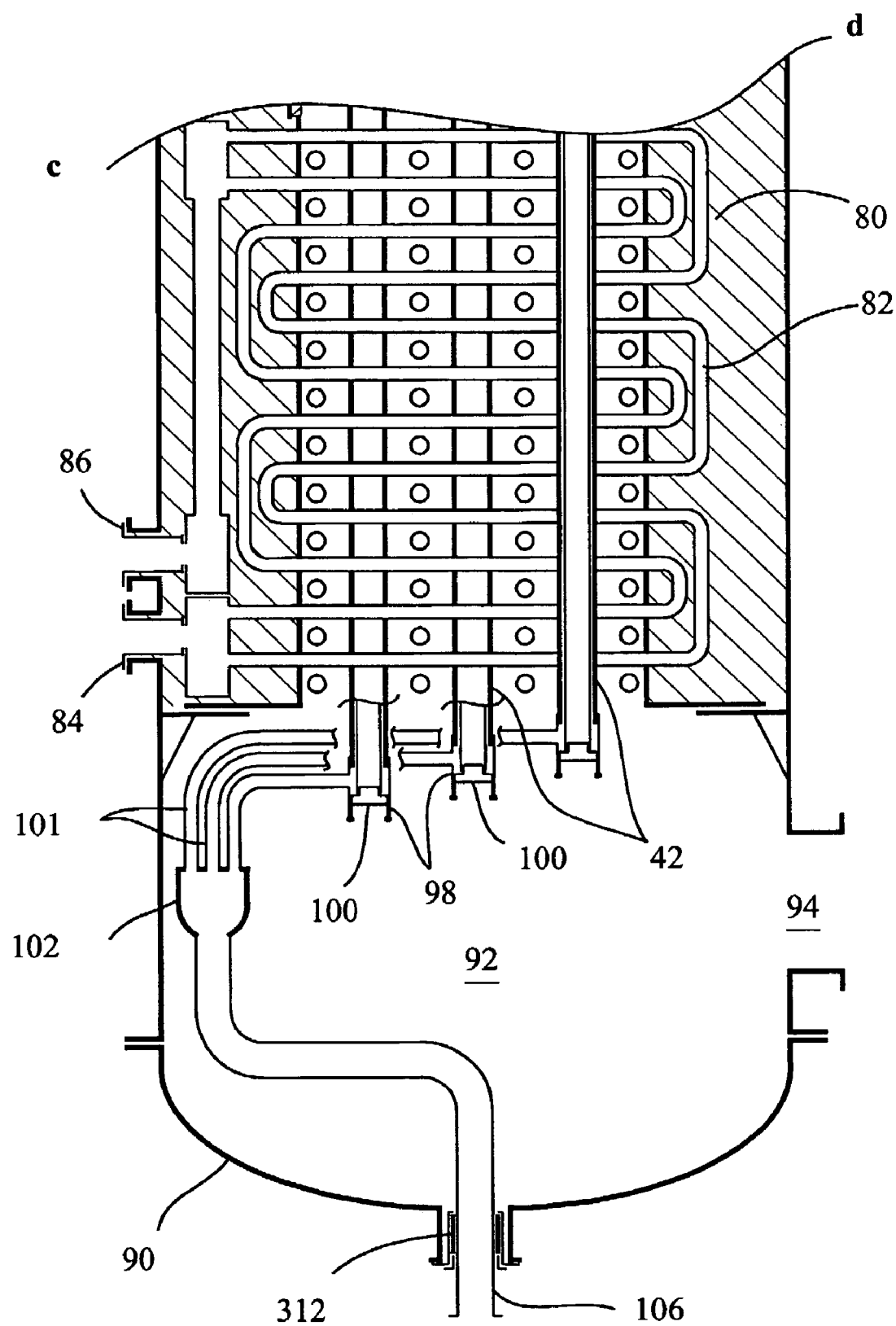
FIG. 1C is a vertical cross section through a bottom part of the apparatus.
Figure 2:
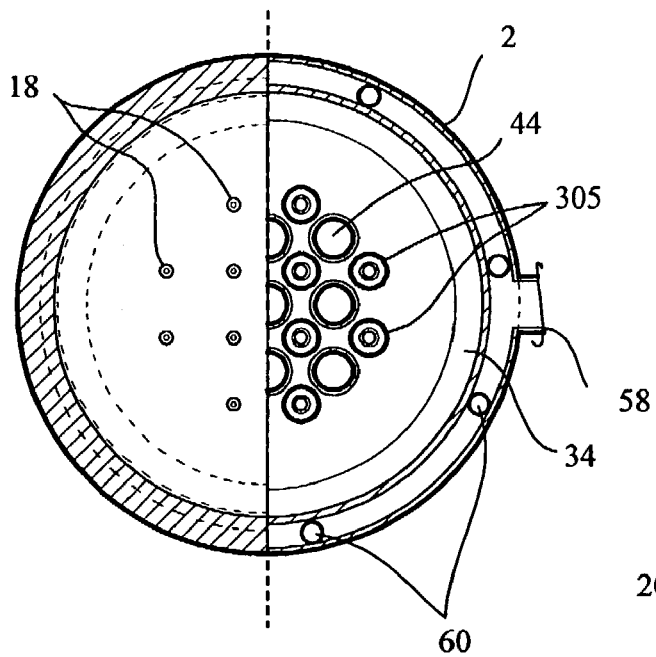
FIG. 2 is a cross section on the line II-II in FIG. 1.
Figure 3:
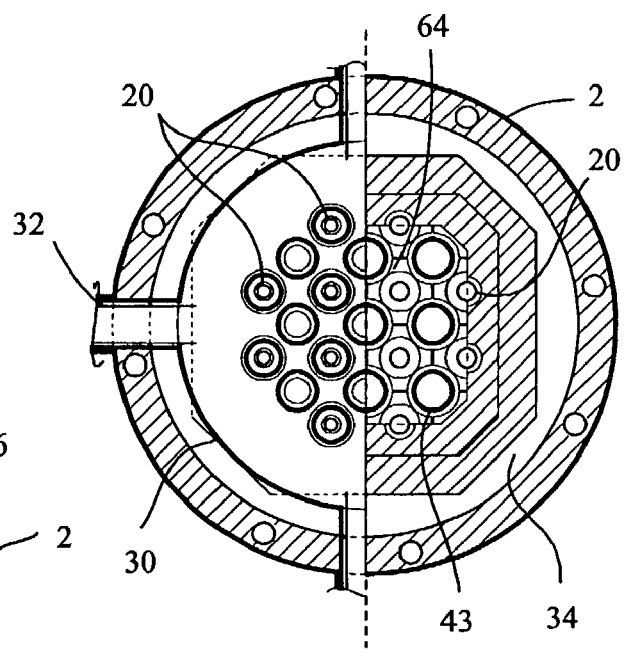
FIG. 3 is a cross section on the line III-III in FIG. 1.
Figure 4:
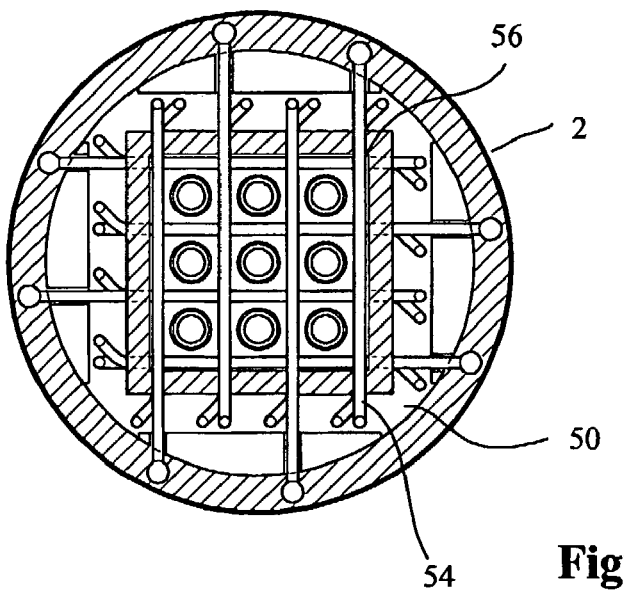
FIG. 4 is a cross section on the line IV-IV in FIG. 1.

Referring first to FIGS. 1 to 4, there is shown an apparatus generally indicated at 1 including a pressure shell 2 domed at each end and adapted for vertical orientation as depicted.

The top dome 4 of the shell, which is provided with insulation 301, defines a fuel plenum 6 with a drilled base of insulating material 8, a fuel inlet 10 being provided axially of the plenum. The dome 4 supermounts a cylinder 12 and a first tube sheet 14 is located intermediate the base 8 and the top of the cylinder 12, the tubesheet 14 and cylinder 12 being connected by a bolted flange 302. An expansion device 16 is provided between the tubesheet 14 and the outer shell 2. The tube sheet 14 is correspondingly drilled to register with the drilled base 8 thereby to accommodate and fix the upper ends 18 of burner tubes 20 which depend therefrom and extend through a second tube sheet 22 and a third tube sheet 24 to penetrate a firebox area 26 defined within the cylinder 12. Restriction orifices 303 are located at the upper end of each burner tube 18, and an insulating layer 304 is provided to part of the outside of each burner tube 20. The dome 4 is removable as is the tube sheet 14 and the burner tubes 20 connected thereto to allow access to the burner tubes 20 for cleaning or replacement.

Between the second and third tube sheets 22, 24 there is formed a plenum 40 wherein in use the process feedstock is introduced, being provided with an inlet port 32 extending through the outer wall 30 of said plenum 40 and the shell 2. The outer wall 30 of the plenum 40 defines an annulus 34 with the wall of the cylinder 12 through which in use combustion air can pass. A plurality of tubes 305 connect, and are connected to, the tubesheets 22, 24 through which the burner tubes 20 extend, the burner tubes 20 being spaced apart from the bores of the tubes 305 such as in use to allow the passage of combustion air through the annulus 38. Layers of insulation 306 are provided internally to tubesheets 22, 24 and to the inside of the outer wall 30 of the plenum 40.

The plenum 40 is in flow communication with endothermic reaction tubes 42 and is provided with access plugs as at 44 to allow the charging and replacement of catalyst 41 which is held within an upper section 43 of each tube 42. The tubes 42 are fixed in the tube sheet 24 but are free to move collectively and individually at their lower ends. Removable tubular inserts 307 are provided at the entrance to tubes 42 for insulation purposes. In a relatively lower section 45 of each tube 42 is axially and spatially disposed a core tube 46 defining an annulus through which process gas is in use caused to flow. The reaction tubes 42 and the burner tubes 20 are regularly arrayed.

The firebox area 26 is defined laterally by layers of insulation 308 surrounding the outermost of the endothermic reaction tubes 42, outside of which is a containing wall 309, which, together with cylinder 12 defines an annular passage 64 for the passage of combustion air.

Downstream of the firebox area 26 in which an exothermic reaction, viz. primary combustion of the fuel, in use occurs is a modular heat recovery zone comprising a first section 50 for preheating combustion air comprising heat exchange tubing 54 in superjacent banks each extending transversely and horizontally through the containing wall 309 and each being orthogonally orientated one to the other to give a matrix 56. Air inlets 58 to the tubing 54 are provided in the shell 2 as shown and communicate therewith via passageways 60 provided inside the outer shell wall, the air exiting from the tubing 54 through the annular passage 64. Penetrating the annular passage 64 are auxiliary burners 65 which are employed for start-up as herein described. Located immediately above the tubing 54 within the firebox area 26 and downstream of the ends of the burner tubes 20 are flow enhancement devices 66 for a purpose to be described below.

A second heat recovery section 70 is located downstream of the first said heat recovery section 50 and comprises banks of heat exchange tubing 72 arrayed in similar manner to those of the first heat recovery zone, and inlet 74 and an outlet 76 being provided in the shell wall in flow communication with the distribution and collection manifolds 310, 311, these being connected to the tubing which is intended to contain the flow of process feedstock for the purpose of preheating the same, the outlet 76 being connected by suitable pipework (not shown) to the inlet port 32 of the plenum 40.

A modular third heat recovery section 80 is disposed subjacent to the second heat recovery section 70 and again is constituted by similar heat exchange tubing 82, there being provided an inlet 84 and an outlet 86 for the flow of fluid to be preheated. Other heat recovery modules (not shown) of similar design may be included between the second and third heat recovery sections 70, 80.

The lower end of the shell 2 is closed by a removable domed base 90 which defines discharge zone 92 registering with the endothermic reaction tubes 42. An exhaust combustion gas outlet 94 is associated with the zone 92 and allows the egress of combustion gases either to atmosphere or to a gas clean-up phase (not shown). The gas clean-up phase may be included within the zone 92 if so desired. The lower ends 98 of the endothermic reaction tubes 42 hold the core tubes 46 and have removable plugs 100 for cleaning purposes and for the removal of the core tubes 46 as the need arises. The ends 98 of the tubes 42 are connected through the agency of small diameter tubing 101 to at least one collection header 102, the tubing 101 being sufficiently flexible to allow for thermal movement without putting compressive stress on the tubes 42.

The process gas exiting from the collection header 102 passes through an outlet 106 for use or further treatment. In this latter respect, the process gas maybe fed to a high or low temperature shift reactor (not shown). The collection header 102 and outlet 106 are free to move in a vertical direction to accommodate overall expansion of the tubes 42. A seal 312 is provided to prevent egress of combustion products to atmosphere around outlet 106.

In operation, preheated fuel is introduced appropriately through inlet 10 into the fuel plenum 6 whence it passes into the burner tubes 20 around which preheated combustion air passes within the annuli 38 defined between the burner tubes 20 and the surrounding tubes 305 passing through the plenum 40. Initially upon start-up, the air entering through inlet 58 and feeding through passageway 60 and thence into the tubing 54 from where it passes into passage 64 is preheated by the use of the auxiliary burners 65. The air may be under superatmospheric pressure, for example 10-15 psig. Combustion of the fuel occurs within the firebox area 26 and the geometry of the burner tubes 20 and the air path is such that initial mixing of the fuel and air is minimised thus delaying combustion and thereby reducing the tendency to produce hotspots on the endothermic reaction tubes 42. The 'turbulent diffusion flames' so produced are characterised by long, thin flames.

The combustion of the fuel is an exothermic reaction and accordingly heat is generated within the firebox area 26 and heat transfer occurs essentially convectively to the endothermic reaction tubes 42 through which flows a process feedstock, for example natural gas and steam. The catalyst 41 within the upper section 43 of each tube 42 occasions a chemical reaction which is endothermic in character and absorbs heat from the combustion gases in the firebox area 26. The combustion gases and the process gas flow co-currently during the heat exchange between the exothermic product and the endothermic reactants.

The combustion gases flow through the firebox area and encounter the flow enhancement devices 66 which serve to reduce the flow area available to the combustion gases and thereby progressively increase the gas velocity and the corresponding heat transfer coefficient to the tubes 42. There is also an increased heat input to the tubes 42 via thermal radiation from devices 66, which are essentially inert shapes.

Coincidentally, the process gas flows downwardly and likewise encounters the core tubes 46 which restrict the flow passage within the tubes 42 thus increasing the flow velocity and enhancing the heat transfer across the walls of the tubes.

The process gas and the combustion gas flow downwards through the apparatus 1 pass through the first heat recovery section 50 wherein combustion air is preheated during its passage from the inlet 58 to the burner tubes 20 via the passageway 60, the tubing 54, and the passage 64. As indicated supra the matrix 56 creates a tortuous path for the combustion gases to take and accordingly an enhancement of the heat transfer mechanism results to both tubes 42 and tubes 54 to optimise efficiency and maximise heat transfer. Dummy tubes 313, which pass through all the heat recovery modules, are provided to prevent by-passing of combustion products and to ensure even removal of heat from all tubes 42.

The principal means of heat transfer within the section 50 is via convection from combustion gases and direct radiation from the endothermic reaction tubes 42, both to the combustion air preheat tubes 54. A small amount of heat is transferred from the combustion gases to the tubes 42, but the net effect is one of heat loss from the tubes 42. Accordingly, both the process gas and exothermic reaction product stream temperatures decrease progressively downwards through section 50.

Further heat is recovered in the second heat recovery section 70 by transfer of heat from the combustion gases and from the process gas to the feedstock which passes from the inlet 74 to the outlet 76 through the tubing 72 in the form of banks forming a matrix. The heat transfer mechanism in this section 70 is essentially the same as that for the first zone 50, except the proportion of the total heat transfer by radiation is much reduced, and that once the temperature of the combustion products is lower than that of the process gas with which it is in thermal communication, heat transfer is from tubes 42 to the combustion products stream, not vice versa. The preheated process feedstock is then fed from the outlet 76 to the inlet port 32 of the manifold 30.

Likewise in relation to the third heat recovery section 80, the manner of heat transfer is similar and in this case a suitable fluid, such as feedstock saturator circulation water can be preheated.

In other preheat sections (not shown) one of the other streams to be preheated includes fuel gas which is subsequently fed to inlet 10 of the apparatus 1.

Figure 5:
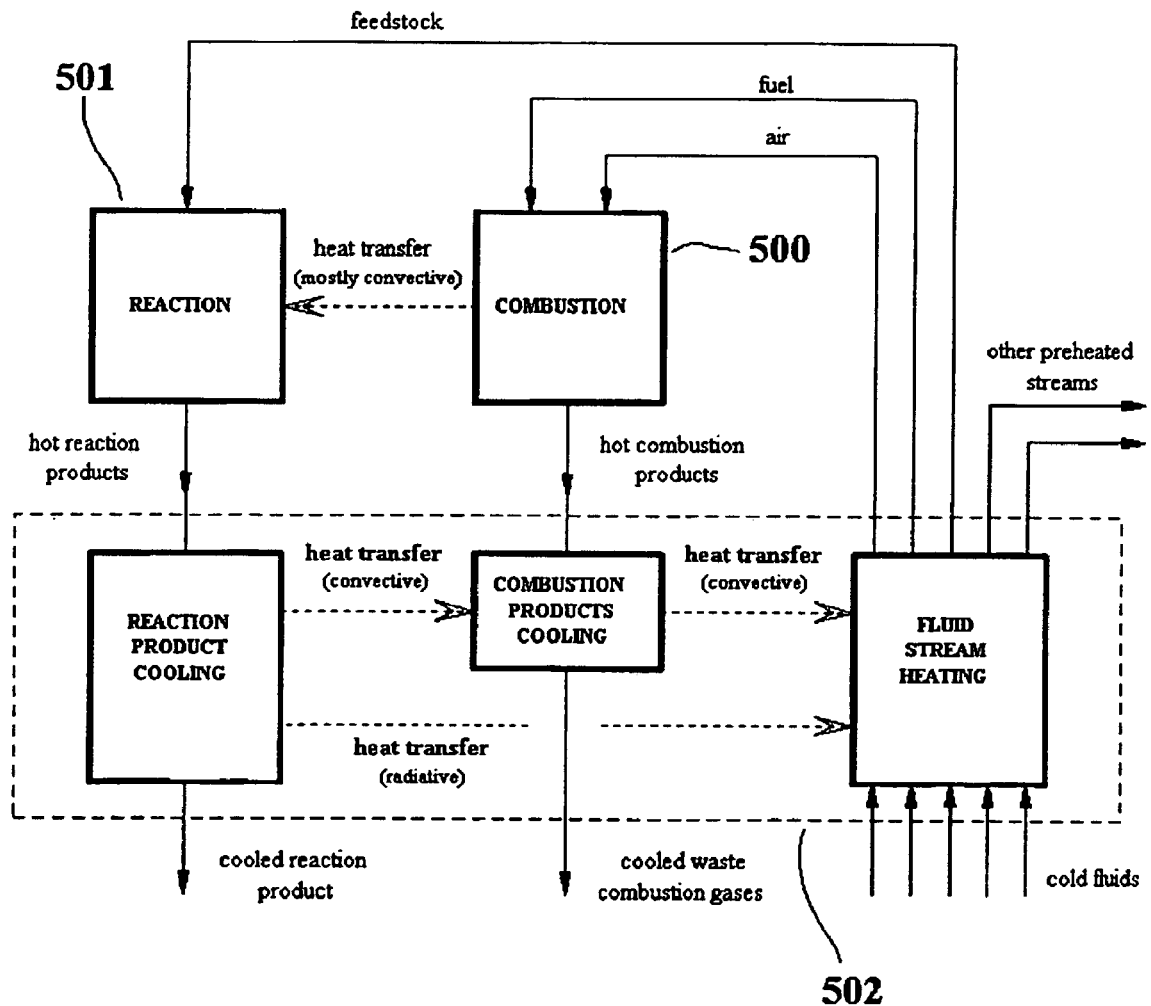
FIG. 5 is a process and heat flow diagram.
Figure 6:
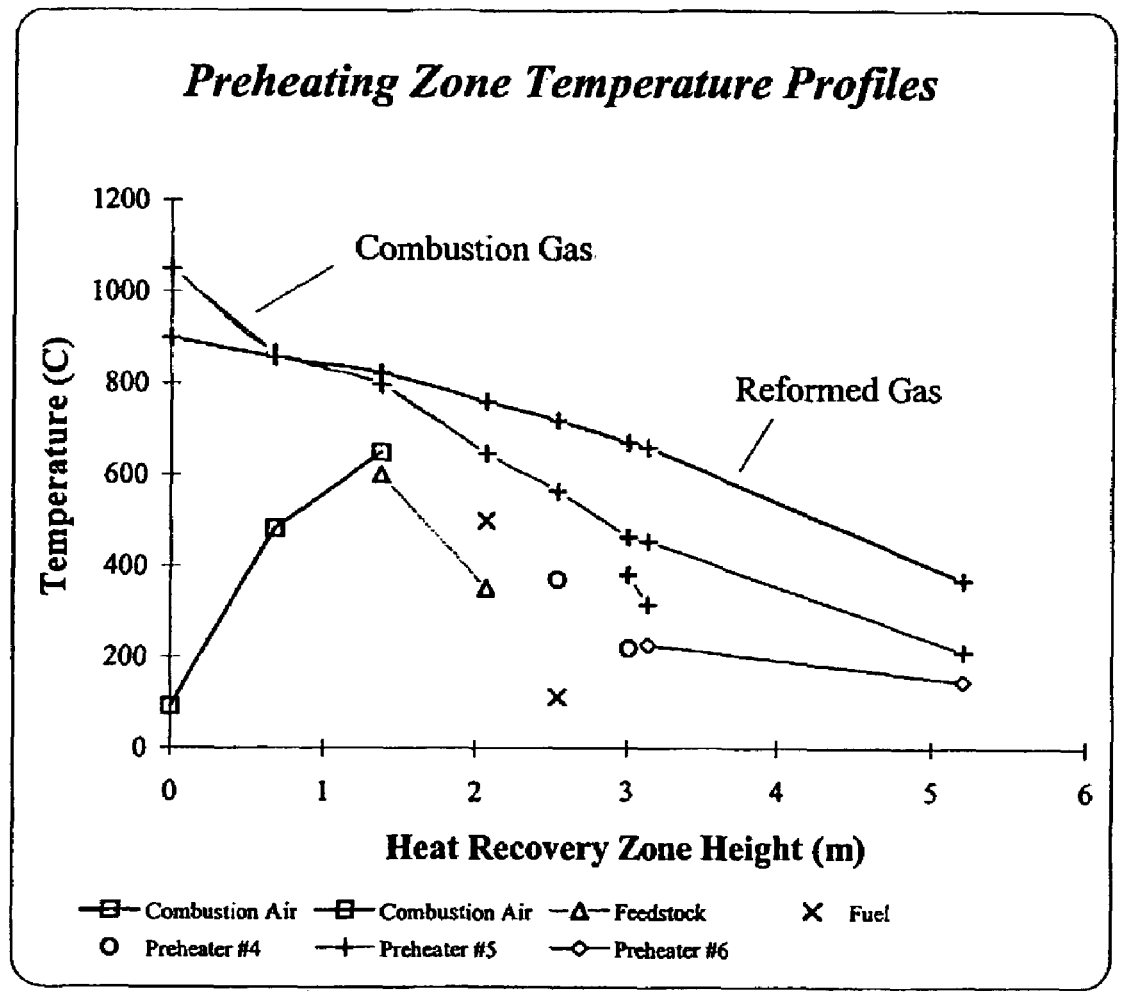
FIG. 6 is a diagram showing the stream temperature profiles versus the distance from the combustion zone.

Referring now to FIG. 5, there is shown a process and heat flow diagram which illustrates the process hereinabove described and shows an exothermic, i.e. combustion, reaction zone 500 wherein preheated fuel is combusted to generate heat which is transferred principally by convection to an endothermic reaction zone 501. A preheated feedstock is fed to the zone 501 and reaction occurs. The hot reaction product passes for reaction product cooling into a heat recovery zone 502 as does the combustion gas stream from zone 500. Convective heat transfer occurs by virtue of combustion gas receiving heat from the process gas. The cold fluid streams receive heat convectively only from the combustion gas stream, as well as a relatively small amount of heat via direct radiation from the process gas tubes. The cold fluid streams include combustion air, fuel and feedstock for the endothermic reaction zone. Other cold fluid streams may also be preheated in zone 502 in the section labelled 'fluid stream heating', the greater the supply of preheat to these streams the greater is the net fuel efficiency of the process.

The combustion gas stream thus cools the reaction product and is itself cooled by the cold incoming fluid streams. The same combustion gas stream is therefore utilised for both heating, in the reaction zone 501 and cooling, in the heat recovery zone 502, of the same process gas stream.

There now follows a specific example describing the detail of the process according to the invention including parametric conditions.

Figure 7A:
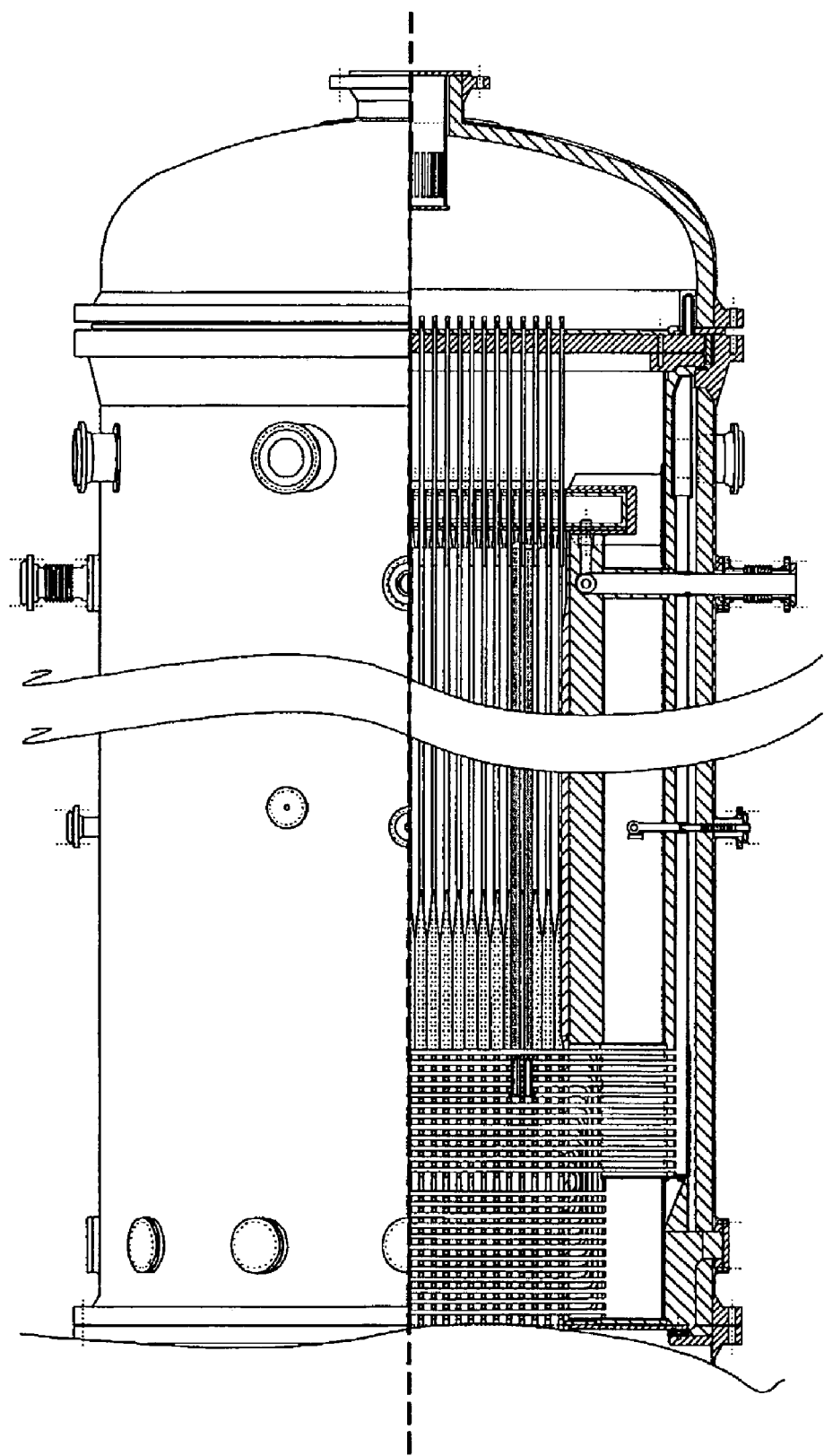
FIG. 7A is a dimensionally consistent drawing showing in part a vertical cross section through the upper part of the apparatus.
Figure 7B:
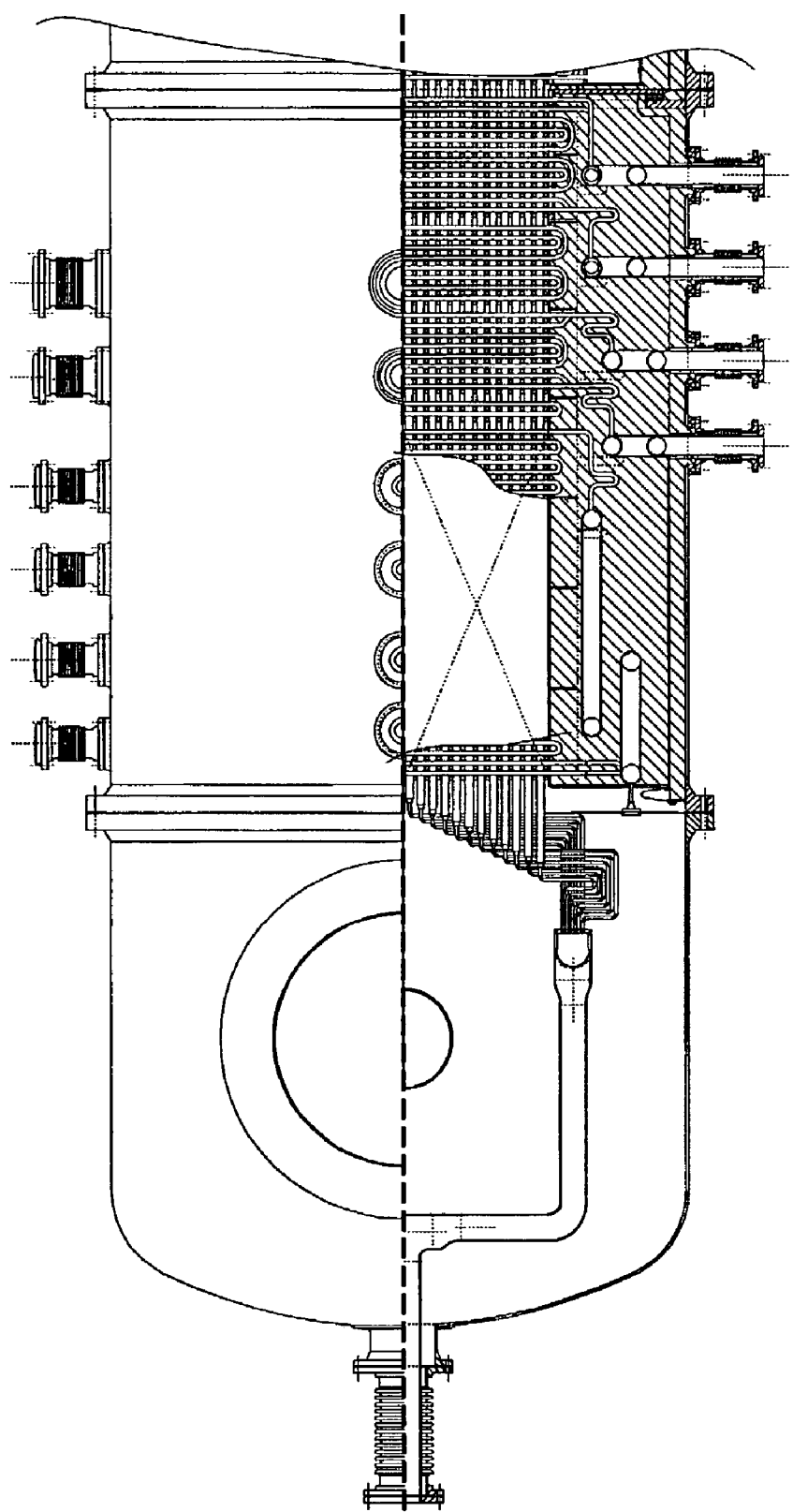
FIG. 7B is a dimensionally consistent drawing showing in part a vertical cross section through the lower part of the apparatus.

By way of example, a mixture of steam and natural gas is fed to the apparatus of FIG. 7 which forms an integral part of a process for the production of hydrogen via steam reforming.

The fuel for the described process is comprised predominantly of recycled purge gas from a hydrogen separation system, such as a Pressure Swing Adsorption (PSA) unit.

In addition to preheating the feedstock, fuel and combustion air within the described apparatus, preheat for other streams within the hydrogen production process is recovered from within the apparatus as indicated in Table 1.

An apparatus according to FIG. 7 with overall dimensions of 3400 mm ID and length 14,200 mm tan/tan is designed to produce a stream containing 34,000 Nm3/hr hydrogen, resulting in a purified hydrogen production rate of 27,250 Nm3/hr (approx. 25 MM scfd), at a moderate 80% hydrogen recovery efficiency.

Feed and product conditions and flows are as indicated in Table 1.

Product gas composition within the apparatus is calculated at 19.7 barg and 900 C assuming an "approach to equilibrium" for the steam/methane reaction of 16.7° C. (30° F.).

Combustion of the fuel is carried out with 10% excess air above stoichiometric requirement.

The temperatures of the product reformed gas and the combustion products gas streams leaving the apparatus are calculated to be 369° C. and 212° C., respectively.

The example illustrates the high net fuel efficiency and heat transfer ratio that may be achieved with the described process and apparatus, which exceed that heretofore achievable in any comparable prior art. It should be considered also that this may be achieved in an apparatus of considerably reduced space and weight than achievable using known conventional reforming technology.

TABLE 1

|  |  | Feed gas | Product gas |
|---|---|---|---|
| flowrate: | (kg mol/hr) | 1750 | 2493 |
| pressure: | (barg) | 28.7 | 18.7 |
| temperature: | (° C.) | 352 | 369 |
| composition: | (mol %) |  |  |
|  | $H_2O$ | 71.94 | 31.62 |
|  | $H_2$ | 2.52 | 50.44 |
|  | CO | — | 10.91 |
|  | $CO_2$ | 1.70 | 5.18 |
|  | $CH_4$ | 23.72 | 1.76 |
|  | $N_2$ | 0.12 | 0.09 |
| Fuel |  |  |  |
| flowrate: | (kg mol/hr) | 699 |  |
| pressure: | (barg) | 3.5 |  |
| temperature: | (C.) | 108 |  |
| LCV: | (W.hr/kg) |  | 2664 |
| Combustion Air |  |  |  |
| flowrate: | (kg mol/hr) | 1834 |  |
| pressure: | (barg) | 1.1 |  |
| temperature: | (C.) | 93 |  |

Heat balance from within the apparatus:
(heat recovery zone only)

| Heat available from comb. products: | (MW) | 20.9 |
|---|---|---|
| Heat available from ref. gas: | (MW) | 13.1 |
| TOTAL: |  | 34.0 |
| Heat loads to preheated streams: | (MW) |  |
| combustion air: |  | 8.8 |
| feedstock: |  | 5.4 |
| fuel: |  | 3.1 |
| prereformer feed: |  | 3.6 |
| desulphuriser feed: |  | 0.5 |
| saturator water heater: |  | 12.6 |
| TOTAL |  | 34.0 |
| Net fuel efficiency *: 86% |  |  |

$$\text{Heat transfer ratio} = \frac{\text{total heat transferred}^{**}}{\text{total heat release}^*} : 1.51$$

\* based on fuel LCV
\*\* total of combustion & heat recovery zones

Figure 8:
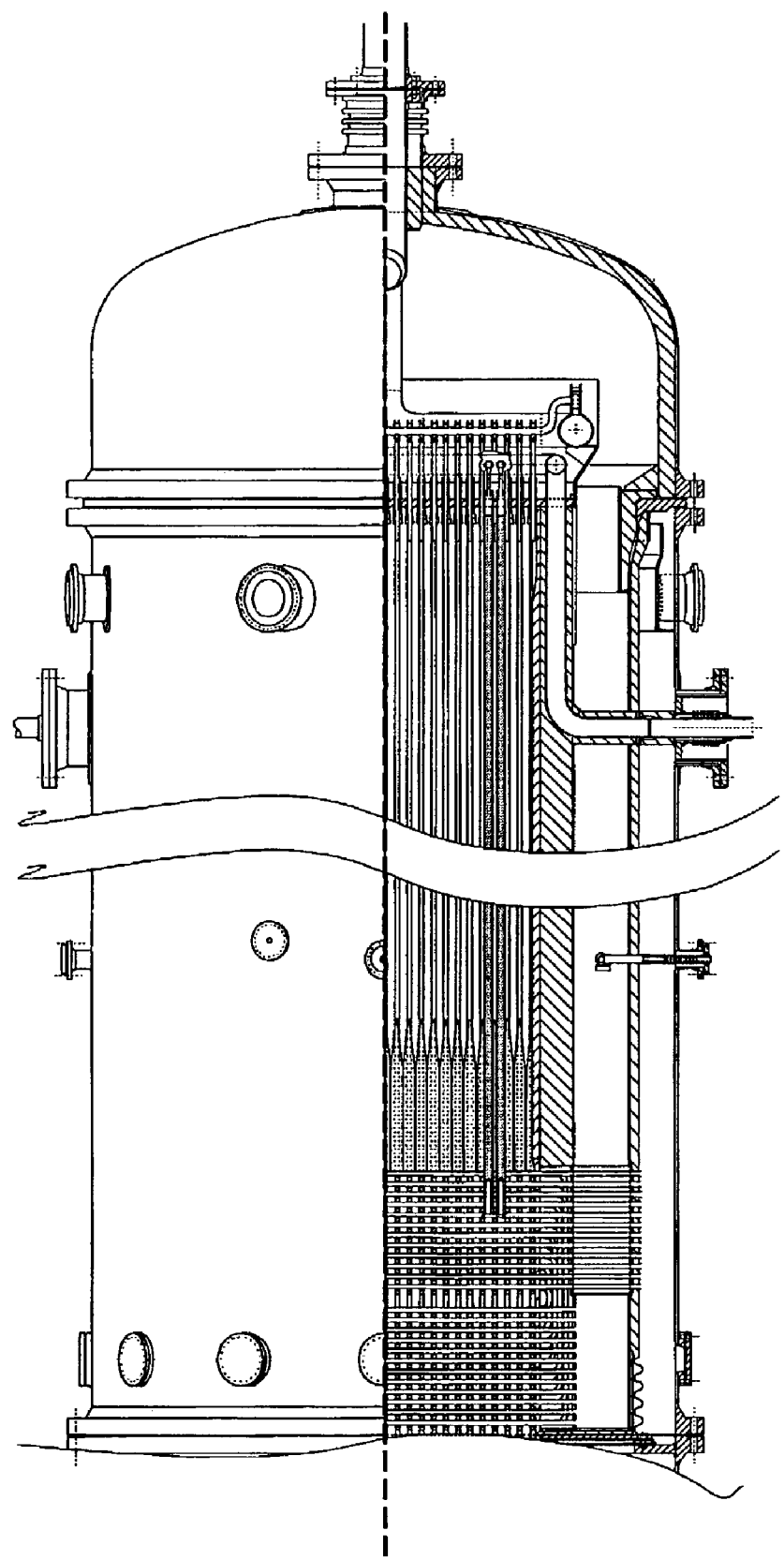
FIG. 8 shows a variation on the apparatus shown in FIG. 7A.

In FIG. 8 there is shown a variation of the apparatus depicted in FIG. 7A in that in place of the tubes sheets employed to locate and support the feedstock and fuel tubes, pipework manifolds are used thereby obviating the need for tubesheets, a single tubesheet or multiple support members being used for the process tubes. Furthermore the inlet combustion air pipes have been removed and the combustion air in this embodiment flows through the outer annulus to the preheater tubes.

It will be understood that the plena and multiple tubesheets may be replaced by appropriate pipework manifolds for distribution of the inlet streams and the invention should be construed accordingly as embracing equivalent configurations.

As will readily be appreciated from the foregoing, the apparatus of the present invention represents a compact and yet effective and efficient means of carrying out in one vessel a series of process stages including both exothermic and endothermic reactions wherein the former provides the requisite heat for the latter with the respective product streams flowing co-currently. The serial arrangement of the heat recovery zones is such as to optimise the heat extraction from the reactions occurring upstream in the vessel with the advantages of preheat for the combustion air and for fuel and the feedstock.

The encapsulation of both exothermic and endothermic reactions coupled with the heat recovery regime within a single vessel further provides the advantage of limited space and volume requirements with high net fuel efficiency.

It will be appreciated by those skilled in the art that the present invention may be reduced to practice in a manner of ways without departing from its general scope. Accordingly, in terms of synthesis gas production, for example of ammonia, the present invention could be employed by providing secondary reforming catalyst in the downstream firebox area whence reformed gas would be fed to the burner tubes in place of fuel gas for partial combustion at high pressure with air above the secondary reforming catalyst. The synthesis gas exiting the secondary reforming catalyst is then subject to heat recovery as described in relation to the drawings.

It is to be understood that whilst the heat recovery tubes have been described as being disposed transversely and horizontally across the vessel, they may be arranged such that the preheat fluid flow therein is in line with the combustion gas and the process gas flow.

INDUSTRIAL APPLICABILITY

In principle, the present invention finds application anywhere where heat is required to be supplied to a process via combustion of fuels. Most commonly, this would be endothermic reactions via combustion of natural gas or other gaseous fuels with air or oxygen.

A particularly suitable example is the production of synthesis gas by the steam reforming of natural gas. From the resultant synthesis gas can be produced numerous downstream products such as hydrogen, methanol, ammonia, synthetic fuels and waxes, and more complex chemicals formed from synthesis gas such as inter alia acetic acid, aldehydes.

Synthesis gas production using the present invention can also find application as a reducing gas in the metallurgical field such as for direct reduced iron (DRI) production.

Another example of a particularly suitable application of the present invention is in processes involving dehydrogenation of various organic feedstocks. Thus ethylene may be produced in the invention from ethane, likewise propylene from propane, butylenes from butanes etc. The products are not limited to olefins, and many cyclic or other complex organic compounds can be produced.

The invention can also be used simply as a fired heater whereby single or multiple streams can be heated by the combustion of suitable fuels. An example would be a steam-raising boiler.

Applications can be found in conjunction with other process equipment items, such as gas turbines, where exhaust from the gas turbine can be utilised as the combustion sustaining medium in the present invention, resulting in very high thermal efficiencies for the combined process.

The principal field of use of the invention is expected to lie in production of hydrogen and synthesis gas derivatives.

Since the present invention results in an apparatus of greatly reduced space and weight, and hence cost, when compared to conventional devices such as steam reformers, as well as high efficiency and modular design, one of the principal applications would be as replacement for these conventional devices in refineries and process plant.

The reduced space and weight make the invention especially useful for locations that are either remote or logistically difficult for the construction of industrial scale process plant, such as offshore. In particular, the use of the present invention would renders possible the construction of offshore fixed platforms, barges or ships containing production facilities to manufacture the aforementioned products, e.g. hydrogen, methanol etc., which has hitherto been impractical owing to the large size and weight of equipment using established technologies. Products from these facilities could be shipped or piped directly to markets elsewhere, thus facilitating the exploitation of small and marginal natural gas fields, which otherwise would be uneconomic for gas extraction.

Further the apparatus of the present invention could be operated at combustion pressures higher than those indicated supra thereby facilitating the recovery of $CO_2$ and water. The actual pressure will depend upon the economics of $CO_2$ removal, but it is envisaged to lie in the range of 5 to 20 barg. A particular application would be in a remote location, for example offshore, whereby gas could be extracted from an oil or natural gas reservoir, hydrogen or other produced, and the combustion products, essentially nitrogen and carbon dioxide, re-injected into the field after further compression. In this way there would be no net $CO_2$ production during the hydrogen manufacture and all the excess carbon would be returned whence it came.

In view of the environmental concerns over $CO_2$ emissions, the present invention may be used to recover and use the hydrogen and energy value of natural gas without the attendant problem of $CO_2$ release to the atmosphere.

In the alternative, $CO_2$ could be extracted from the combustion products, prior to re-injection of the $CO_2$ alone. Accordingly, for every mole of methane recovered one mole of $CO_2$ would be re-injected. The only significant plant emission would then be nitrogen from the air consumed.

The present invention lends itself to the recovery of $CO_2$ in view of the high pressures involved. Furthermore increasing the combustion air pressure within the vessel is not problematical and is more efficient and less costly than compressing the combustion products.

The present invention is thus versatile in terms of its wide range of applications.

The invention claimed is:

1. A process for carrying out an endothermic reaction including the steps of initiating in an exothermic reaction region an exothermic reaction by combusting a preheated fuel in the presence of a preheated combustion-sustaining medium thereby to generate heat to produce a combustion gas stream, causing a feedstock stream to undergo an endothermic reaction in an endothermic reaction region adjacent to the exothermic reaction region, transferring heat substantially convectively from the combustion gas stream to the feedstock stream thereby to produce a process gas stream, the combustion gas stream and the feedstock streams being in co-current flow relationship, passing the combustion gas stream and the process gas stream co-currently into a heat recovery zone downstream of the exothermic reaction zone wherein heat from the process gas stream is convectively transferred to the combustion gas stream, and simultaneously heat is recovered by passing the combustion gas stream in convective heat exchange relation with the combustion-sustaining medium and with the process feedstock and with the fuel thereby to control the temperature of the process gas and combustion gas streams, the process gas stream being fed directly and continuously through the heat recovery zone, and the combustion gas stream and the process gas stream being discharged from the process at a temperature level whereby the overall efficiency of the process is optimised.

2. A process according to claim 1 in which further fluid streams are passed in heat exchange with the process gas and the combustion gas streams thereby further to control the temperature of the process gas and combustion gas streams.

3. A process according to claim 2 in which one of the further fluid steams is water for the generation of steam for use in the endothermic reaction.

4. A process according to claim 1 in which the process is carried out in a single vessel.

5. A process according to claim 1 in which the preheated combustion-sustaining medium follows a path within the vessel whereby the internal surfaces with which it comes into contact are maintained at a substantially even temperature by the medium.

6. A process according to claim 1 in which after preheating in the heat recovery zone, the fuel and the combustion-sustaining medium, and the feedstock are fed in bulk to their respective zones.

7. A process according to claim 1 in which the sum of the exit temperatures in degrees Celcius of the combustion gas stream and the process gas stream does not exceed the peak temperature in degrees Celcius of the endothermic process gas stream.

8. A process according to claim 7 in which the exit temperature of the endothermic process gas stream is less than 4500° C.

9. A process according to claim 8 in which the exit temperature of the combustion products is less than 3000° C.

10. A process according to claim 1 in which the combustion-sustaining medium and the fuel are separately preheated to a temperature sufficient to sustain auto-ignition.

11. A process according to claim 1 in which the flow within the heat recovery zone of the heat recipient streams is substantially transverse to the direction of flow of the exothermic and endothermic reaction streams.

12. A process according to claim 1 in which the velocity of the combustion gas and process gas streams is enhanced thereby to increase the heat transfer coefficient.

13. A process according to claim 12 in which the velocity of the combustion gas stream is increased at the downstream end of the exothermic reaction zone thereby to increase the heat transfer coefficient of the combustion gas stream in relation to the process gas stream.

14. A process according to claim 12 in which the velocity and the tortuosity of the combustion gas stream are increased thereby to increase the heat transfer coefficients in relation to the heat recovery zone.

15. A process according to claim 1 in which an endothermic reaction catalyst is employed in the endothermic reaction zone.

16. A process according to claim 1 in which the temperature of the feedstock stream and of the fuel and of the other fluid streams can be modulated thereby to control the peak temperature in the endothermic reaction zone without varying the ratio of the fuel and combustion-sustaining medium flows.

17. A process according to claim 1 in which the combustion gas stream is fed downstream of the heat recovery zone to a treatment zone wherein the gas is cleaned.

\* \* \* \* \*